(12) United States Patent
Naous et al.

(10) Patent No.: US 10,404,568 B2
(45) Date of Patent: Sep. 3, 2019

(54) AGENT MANAGER FOR DISTRIBUTED TRANSACTION MONITORING SYSTEM

(71) Applicant: AppDynamics LLC, San Francisco, CA (US)

(72) Inventors: Jad Naous, San Francisco, CA (US); Chi Cao Minh, San Mateo, CA (US)

(73) Assignee: Cisco Technology, Inc., San Jose, CA (US)

(*) Notice: Subject to any disclaimer, the term of this patent is extended or adjusted under 35 U.S.C. 154(b) by 214 days.

(21) Appl. No.: 14/814,754

(22) Filed: Jul. 31, 2015

(65) Prior Publication Data

US 2017/0033980 A1 Feb. 2, 2017

(51) Int. Cl.
*H04L 12/24* (2006.01)
*H04L 12/26* (2006.01)

(52) U.S. Cl.
CPC ............ *H04L 43/12* (2013.01); *H04L 41/046* (2013.01); *H04L 41/0893* (2013.01)

(58) Field of Classification Search
CPC ............ H04L 67/2819; H04L 41/0869; H04L 41/509; H04L 41/0813; H04L 41/12; H04L 41/50; H04L 43/08; H04L 43/10; H04L 41/0893; H04L 41/5041; H04L 61/1511; H04L 65/403; H04L 65/60; H04L 67/2842; H04L 41/0816; H04L 47/70; H04L 61/1535; H04L 61/6009; H04L 41/046; H04L 47/20; G06F 9/45558; G06F 11/0712; G06F 2201/87; G06F 9/45533; G06F 11/30; G06F 2209/508; G06F 3/0662; G06F 2009/4557; G06F 21/105; G06F 2201/875; G06F 8/60; G06F 9/44521; G06F 9/45504; G06F 9/4862; G06F 9/5088; G06F 11/0709; G06F 11/0784; G06F 11/079

See application file for complete search history.

(56) References Cited

U.S. PATENT DOCUMENTS

| 2004/0139426 A1* | 7/2004 | Wu | G06F 17/30873 717/120 |
| 2011/0209196 A1* | 8/2011 | Kennedy | G06F 21/55 726/1 |
| 2012/0066681 A1* | 3/2012 | Levy et al. | G06F 9/4555 718/1 |

(Continued)

Primary Examiner — Djenane M Bayard
(74) Attorney, Agent, or Firm — Behmke Innovation Group LLC; James Behmke; Stephen D. LeBarron

(57) ABSTRACT

An agent manager manages and configures a plurality of agents suitable for execution on different types of applications and server platforms. The agent manager may receive a collection of rules for determining how to deploy, manage and maintain different agents. The agent manager may collect data about the agents and a local machine, communicate with and configure the agents, and communicate with remote machines such as a controller. The agent manager may configure the agents based on one or more rules the agent receives, such as for example a set of rules provided by a controller. The agent manager may parse the received rules, identify any agents that need to be installed or uninstalled, installed agents that need to be turned on, off, or restarted, or agents that should be otherwise modified, for example with an update, a plug-in, a feature enabled or disabled, or some other update.

15 Claims, 7 Drawing Sheets

(56) References Cited

U.S. PATENT DOCUMENTS

| | | | |
|---|---|---|---|
| 2012/0259960 A1* | 10/2012 | Sharma | G06F 11/3006 |
| | | | 709/221 |
| 2014/0108463 A1* | 4/2014 | Gagliardi | G06F 11/3495 |
| | | | 707/797 |
| 2016/0277499 A1* | 9/2016 | Kottomtharayil | H04L 12/66 |
| 2017/0083358 A1* | 3/2017 | Zada | G06F 9/5011 |

* cited by examiner

AGENT MANAGER FOR DISTRIBUTED TRANSACTION MONITORING SYSTEM

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

As the popularity of e-commerce e-services grows, the sophistication and architecture of network architectures has become more complicated as well. Applications may be implemented in several languages, and those diverse applications may be implemented on a variety of platforms, each having different rules and protocols for implementing programs.

The application performance monitoring (APM) systems that monitor the diverse applications on a variety of platforms become more complicated in order to comply with the application and platform protocols. Different portions of the APM often require a specific protocol or instructions to operate. What is needed is an improved system for monitoring an application having a diverse set of languages and platforms.

SUMMARY

The present technology, roughly described, provides an agent manager that manages and configures a plurality of agents suitable for execution on different types of applications and server platforms. The agent manager may receive a collection of rules for determining how to deploy, manage and maintain different agents. The agent manager may collect data regarding a local machine as well as agents installed on the machine, communicate with and configure the agents, and communicate with remote machines such as a controller.

The agent manager may configure the agents based on one or more rules the agent receives, such as for example a set of rules provided by a controller. The agent manager may parse the received rules, identify any agents that need to be installed or uninstalled, installed agents that need to be turned on, off, or restarted, or agents that should be otherwise modified, for example with an update, a plug-in, a feature enabled or disabled, or some other update.

An embodiment may include a method for managing agents that monitor a distributed transaction. An agent may be provided on a server that hosts an application of two or more applications. The application may be one of a plurality of applications that implement a distributed transaction, and the agent may monitor the application. An agent manager may be provided on the server that hosts the application. A set of rules may be received by the agent manager from a remote server. The set of rules may be applied by the agent manager to the agent. The set of rules may be applied by the agent manager to the agent to configure the agent.

An embodiment may include a system for managing agents that monitor a distributed transaction. The system may include a processor, memory, and one or more modules stored in memory and executable by the processor. When executed, the modules may provide an agent on a server that hosts an application of two or more applications, the application one of a plurality of applications that implement a distributed transaction, the agent monitoring the application, provide an agent manager on the server that hosts the application, receive a set of rules by the agent manager from a remote server, the set of rules to be applied by the agent manager to the agent, and apply the set of rules by the agent manager to the agent to configure the agent.

DETAILED DESCRIPTION

The application monitoring system of the present technology includes an agent manager that manages and configures a plurality of agents suitable for execution on different types of applications and server platforms. The agent manager may receive a collection of rules for determining how to deploy, manage and maintain different agents. The agent manager may collect data regarding a local machine as well as agents installed on the machine, communicate with and configure the agents, and communicate with remote machines such as a controller.

The agent manager may configure the agents based on one or more rules the agent receives, such as for example a set of rules provided by a controller. The agent manager may parse the received rules, identify any agents that need to be installed or uninstalled, installed agents that need to be turned on, off, or restarted, or agents that should be otherwise modified, for example with an update, a plug-in, a feature enabled or disabled, or some other update.

Figure 1:
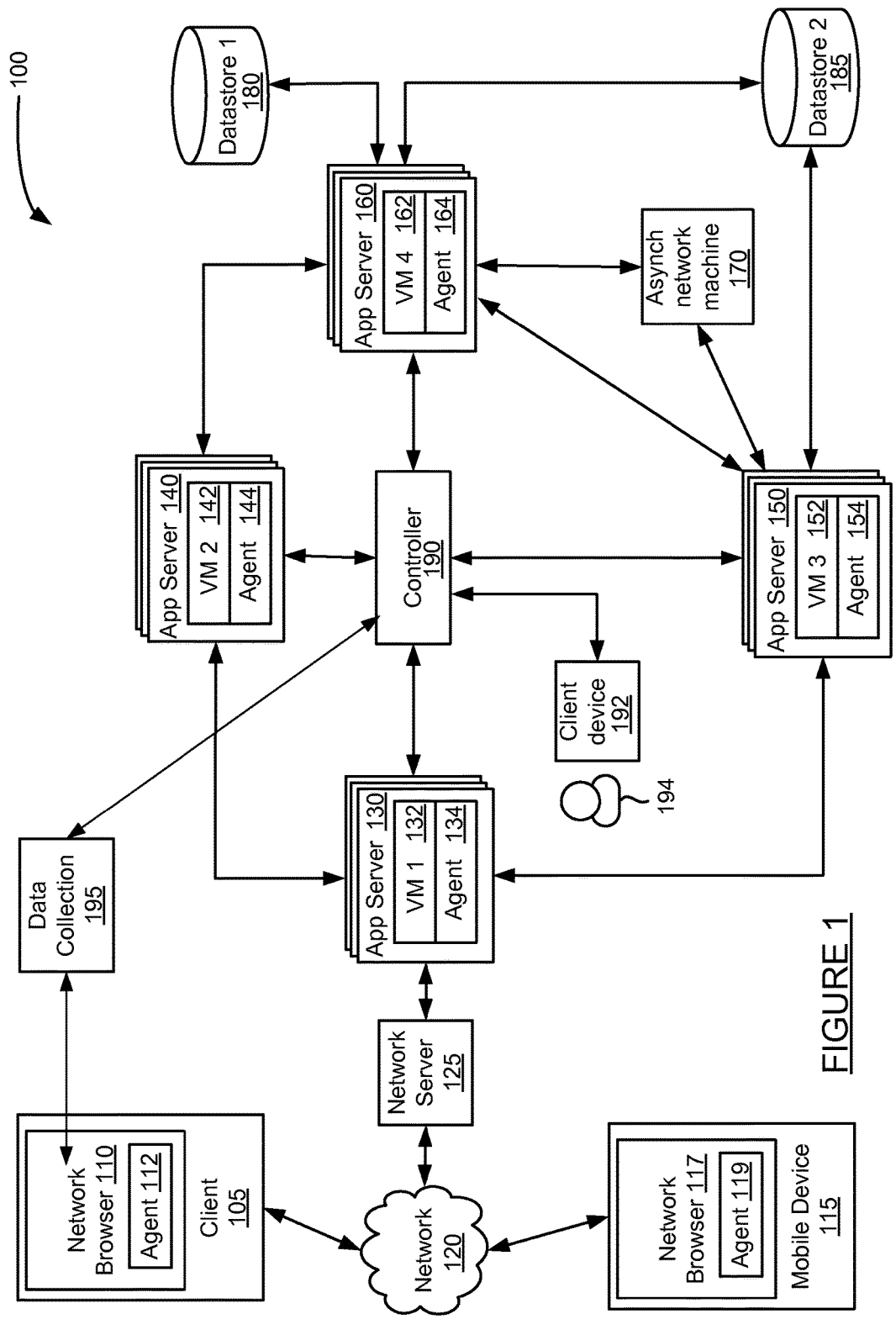
FIG. 1 is a block diagram of a system for implementing an agent manager in an application monitoring system.

FIG. 1 is a block diagram of a system for implementing an agent manager in an application monitoring system. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request or a network at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks. The network 120 may include one or more machines such as load balance machines and other machines.

Network server 125 is connected to network 120 and may receive and process requests received over network 120. Network server 125 may be implemented as one or more servers implementing a network service, and may be implemented on the same machine as application server 130. When network 120 is the Internet, network server 125 may be implemented as a web server. Network server 125 and application server 130 may be implemented on separate or the same server or machine.

Application server 130 communicates with network server 125, application servers 140 and 150, and controller 190. Application server 130 may also communicate with other machines and devices (not illustrated in FIG. 1). Application server 130 may host an application or portions of a distributed application. The host application 132 may be in one of many platforms, such as including a Java, PHP, .NET, Node.JS, be implemented as a Java virtual machine, or include some other host type. Application server 130 may also include one or more agents 134 (i.e. "modules"), including a language agent, machine agent, and network agent, and other software modules. Application server 130 may be implemented as one server or multiple servers as illustrated in FIG. 1.

Application 132 and other software on application server 130 may be instrumented using byte code insertion, or byte code instrumentation (BCI), to modify the object code of the application or other software. The instrumented object code may include code used to detect calls received by application 132, calls sent by application 132, and communicate with agent 134 during execution of the application. BCI may also be used to monitor one or more sockets of the application and/or application server in order to monitor the socket and capture packets coming over the socket.

In some embodiments, server 130 may include applications and/or code other than a virtual machine. For example, server 130 may include Java code, .NET code, PHP code, Ruby code, C code or other code to implement applications and process requests received from a remote source.

Agents 134 on application server 130 may be installed, downloaded, embedded, or otherwise provided on application server 130. For example, agents 134 may be provided in server 130 by instrumentation of object code, downloading the agents to the server, or in some other manner. Agents 134 may be executed to monitor application server 130, monitor code running in a Java virtual machine 132 or other program language, such as a PHP, .NET, Node.js, Python, C, or C++), machine resources, network layer data, and communicate with byte instrumented code on application server 130 and one or more applications on application server 130.

Each of agents 134, 144, 154 and 164 may include one or more agents, such as a language agent, machine agents, and network agent. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agents 134, 144, 154 and 164 may also include an agent manager. The agent manager may install and uninstall agents, collect information from agents, applications, operating systems and machines on which they are installed, modify or update agents, and provide commands and instructions to agents. An agent manager is discussed in more detail with respect to FIG. 3.

Agent 134 may detect operations such as receiving calls and sending requests by application server 130, resource usage, and incoming packets. Agent 134 may receive data, process the data, for example by aggregating data into metrics, and transmit the data and/or metrics to controller 190. Agent 134 may perform other operations related to monitoring applications and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (memory, processor, and so on). A tier of nodes may include a plurality of nodes which may process a similar business transaction, may be located on the same server, may be associated with each other in some other way, or may not be associated with each other.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application Ser. No. 12/878,919, titled "Monitoring Distributed Web Application Transactions," filed on Sep. 9, 2010, U.S. Pat. No. 8,938,533, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and agents. Each application may run on the corresponding application server. Each of applications 142, 152 and 162 on application servers 140-160 may operate similarly to application 132 and perform at least a portion of a distributed business transaction. Agents 144, 154 and 164 may monitor applications 142-162, collect and process data at runtime, and communicate with controller 190. The applications 132, 142, 152 and 162 may communicate with each other as part of performing a distributed transaction. In particular each application may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive application data, including data associated with monitoring client requests at client 105 and mobile device 115, from data collection server 160. In some embodiments, controller 190 may receive application monitoring data and network data from each of agents 112, 119, 134, 144 and 154. Controller 190 may associate portions of business transaction data, communicate with agents to configure collection of data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, workstation or other computing device. Client computer 192 may communicate with controller 190 to create and view a custom interface. In some embodiments, controller 190 provides an interface for creating and viewing the custom interface as content page, e.g., a web page, which may be provided to and rendered through a network browser application on client device 192.

Applications 132, 142, 152 and 162 may be any of several types of applications. Examples of applications that may implement applications 132-162 include a Java, PHP, .Net, Node.JS, and other applications.

Figure 2:
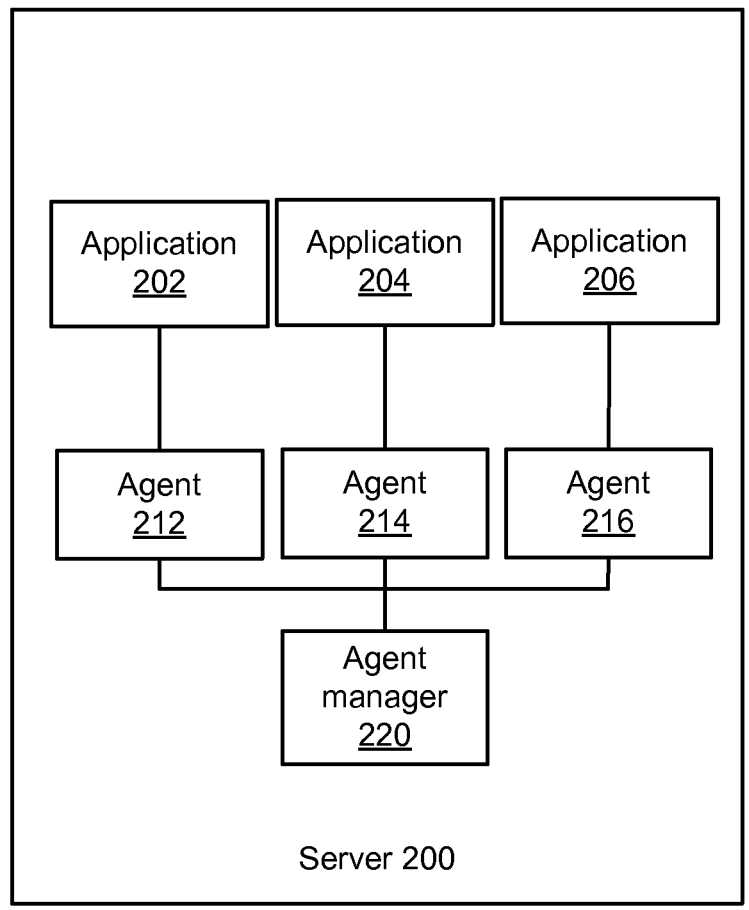
FIG. 2 is a block diagram of a server having a plurality of agents and an agent monitor.

FIG. 2 is a block diagram of an application server having a plurality of agents and an agent manager. Server 200 includes applications 202, 204 and 206, agents 212, 214, and 216, and agent manager 220. Server 200 may have one of several operating systems, such as Linux, iOS, Android and Windows. Applications 202-206 may be one of several types of applications, such as for example a Java, .Net, PHP, Node.JS, Python, C++, iOS, Android, or some other type of application. Each of these applications, being in a potentially different language or executing on a different platform, may have its own rules and protocols for installation, starting, and stopping, communication and other protocols.

Agents 212, 214, and 216 may monitor applications 202, 204 and 206, respectively. As a result, each of these agents is compatible with the particular type of application. Thus, an agent may be configured to communicate with a Java, .Net, PHP, Node. JS, Python, C++, iOS, Android, Windows, or other protocol used by the particular application. Additionally, the agent may be configured monitor server resources, a network, or some other type of agent.

Agent manager 220 may communicate with each of agents 212-216, complying with communication and other protocols implemented by each agent. More detail for an agent manager is provided with respect to FIG. 3.

Figure 3:
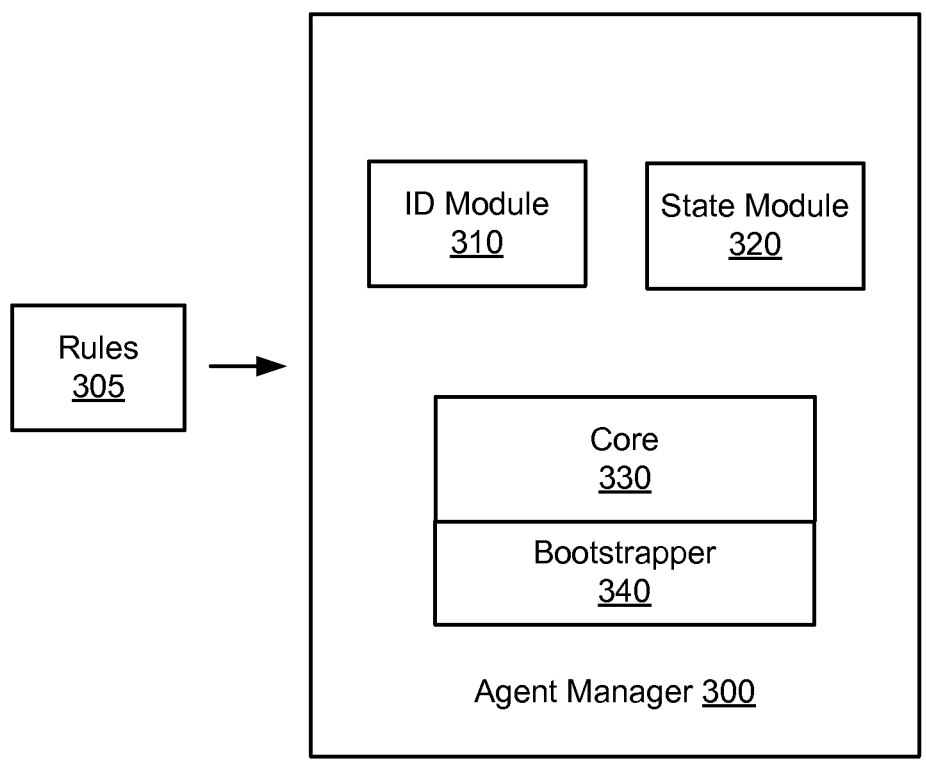
FIG. 3 is a block diagram of an agent monitor.

FIG. 3 is a block diagram of an agent manager. The agent manager may include an identification module 310, state module 320, core 330, and bootstrap 340. Agent manager 300 may receive rules 305, such as for example from a controller which receives user configured rules or generates rules in some other manner. The rules may include one or more sets of an action, recipient agent, and machine type. The rules may indicate what action to perform on a particular type of agent on a particular type of machine. For example, the rules may indicate that Java agents should be started on Windows machines, or on Windows machines in a particular server cluster.

The ID module 310 may collect data on the server on which it is installed. The information may include a list of the installed agent, installed agent status, machine information such as an IP address and operating system, and other information. The information collected by the ID module 310 may be provided to state module 320 for reporting to the controller as well as to core 330 for determining how to apply rules.

State module 320 may communicate with each agent to update an agent, install, uninstall and restart the agents, enable and disable agent features and plugins, and provide other actions and commands to an agent.

Core 330 may parse the received rules and determine whether any action needs to be taken by the particular agent manager. Core 330 may include logic to perform the parsing, determine if any rules apply to the present machine and agent manager, and carry-out any required actions. If action does need to be taken, the core 330 module includes logic that will provide instructions to state module 320 based on the rules and data collected by the identification module 310.

Bootstrap 340 may be used to download and install the agent manager 300 as well as provide updates to the agent manager.

Figure 4:
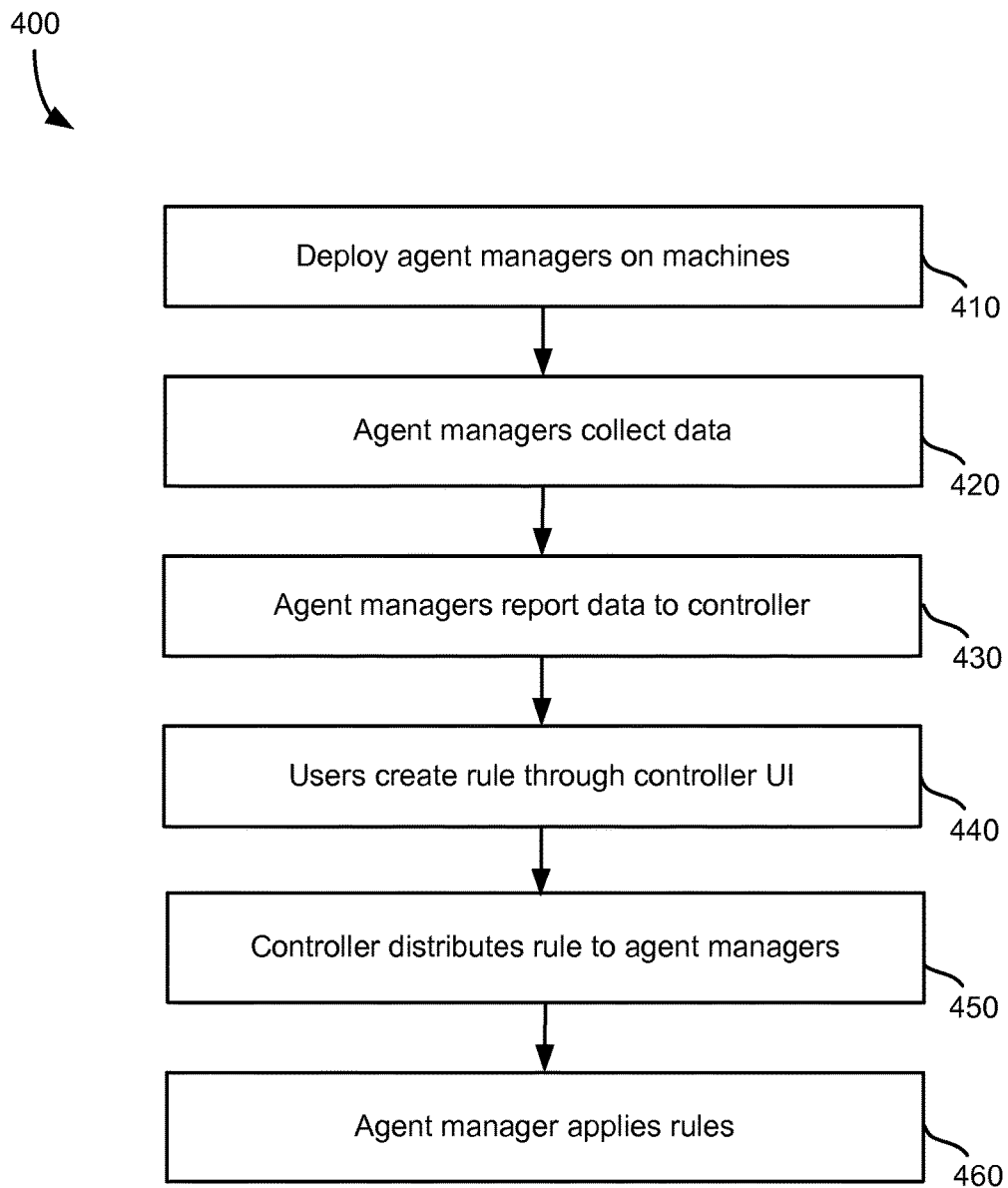
FIG. 4 is a method for implementing an agent manager.

FIG. 4 is a method for implementing an agent manager. First, agent managers are deployed on machines at step 410. Deployment of an agent manager may include installing a bootstrap module on a particular application server, and allowing the bootstrap module to download and install the files required to generate the agent manager. Agent managers, once installed, may collect data at step 420. The data collection may be performed by ID module 310 at the local application server. The collected data may include the quantities and types of agents currently installed on the application server, as well as their status (installed, started, error state) machine information such as IP address and operating system, as well as other information.

An agent manager may report data to a controller at step 430. The reported data may include the status of the agents, the status of the agent manager, receipt confirmation of a set of rules, and other data and information. At some point, one or more rules may be created, for example by a user, at step 440. The rule may be created in several ways, including through an interface provided to user through a web browser. The rule may identify an action to take on a particular type of agent located on a particular type of machine or platform. Creating a rule is discussed in more detail with respect to the method of FIG. 5.

The one or more rules may be distributed to an agent manager, for example by the controller, at step 450. In some instances, all agent managers will receive an entire set or "book" of rules. In some implementations, the agent manager on a particular machine may receive rule updates, a subset of an entire set of rules based on the applications or machine associated with the agent manager, or some other subset of rules other than the entire set of rules. The rules may be received periodically, in response to an event that occurs at the controller, or in response to an event at or request by the agent manager.

After receiving the rules, the agent manager applies the rules to the agents at the application server at step 460. In some instances, the logic for performing each action is contained in the core of the agent manager. The logic may be implemented as a script or other set of instructions once the rule is received by the agent manager. More details for applying rules by an agent manager are described with respect to the method of FIG. 6.

Figure 5:
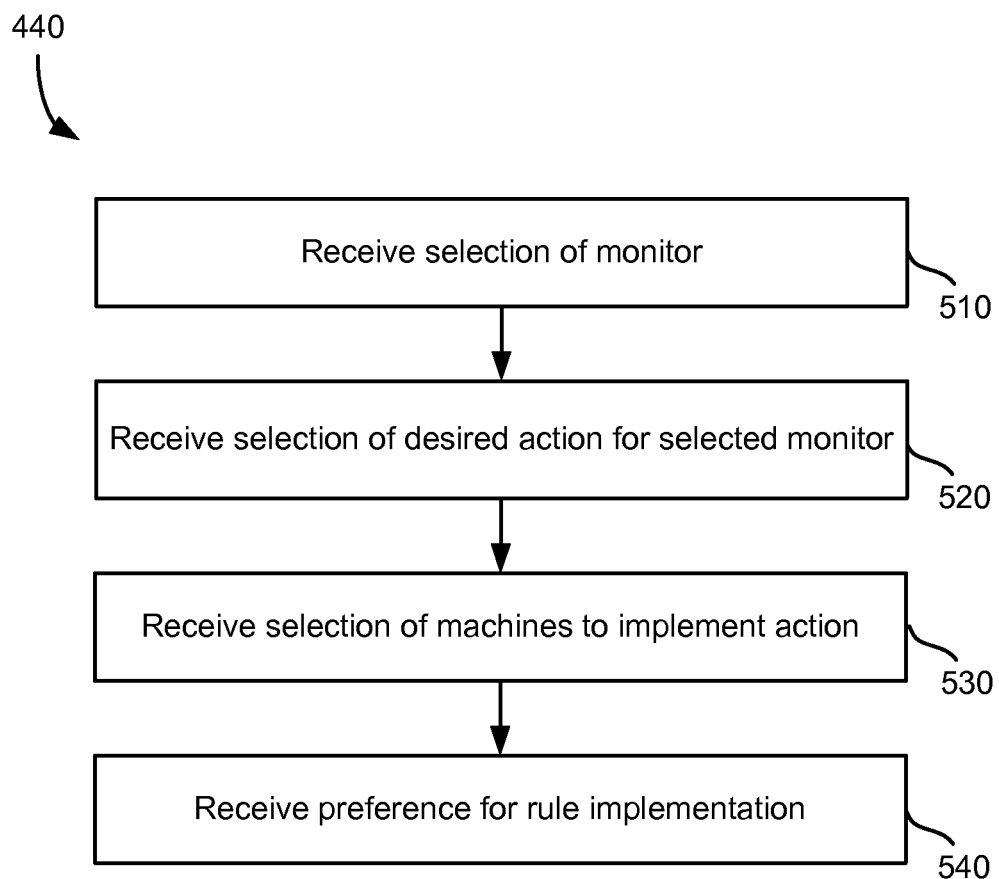
FIG. 5 is a method for creating a rule through a user interface.

FIG. 5 is a method for creating rules. First, a selection of an agent is received at step 510. Method 500 of FIG. 5 provides more detail for step 440 of the method of FIG. 4. The agent selection may include one or more types of agents, such as for example a Java, .Net, PHP, Node. JS, Python, C++, iOS, Android, machine, network, or other type of agent. A selection of a desired action for those selected agents is received at step 520. The actions may be anything that may be applied to a particular agent, such as for example install or uninstall, start or end, update or revert to a previous version, install or remove a particular plug-in, and enable or disable a feature.

A selection of machines to implement the action is received at step 530. The machines by platform, type, logical grouping, geographical location, or some other grouping. A preference for implementing the rules is then received at step 540. The preference may include applying the rules once, applying the rules periodically over time, based on a particular event, or in some other manner. Once the rules are created, they may be transmitted to one or more agent managers in communication with a controller.

Figure 6:
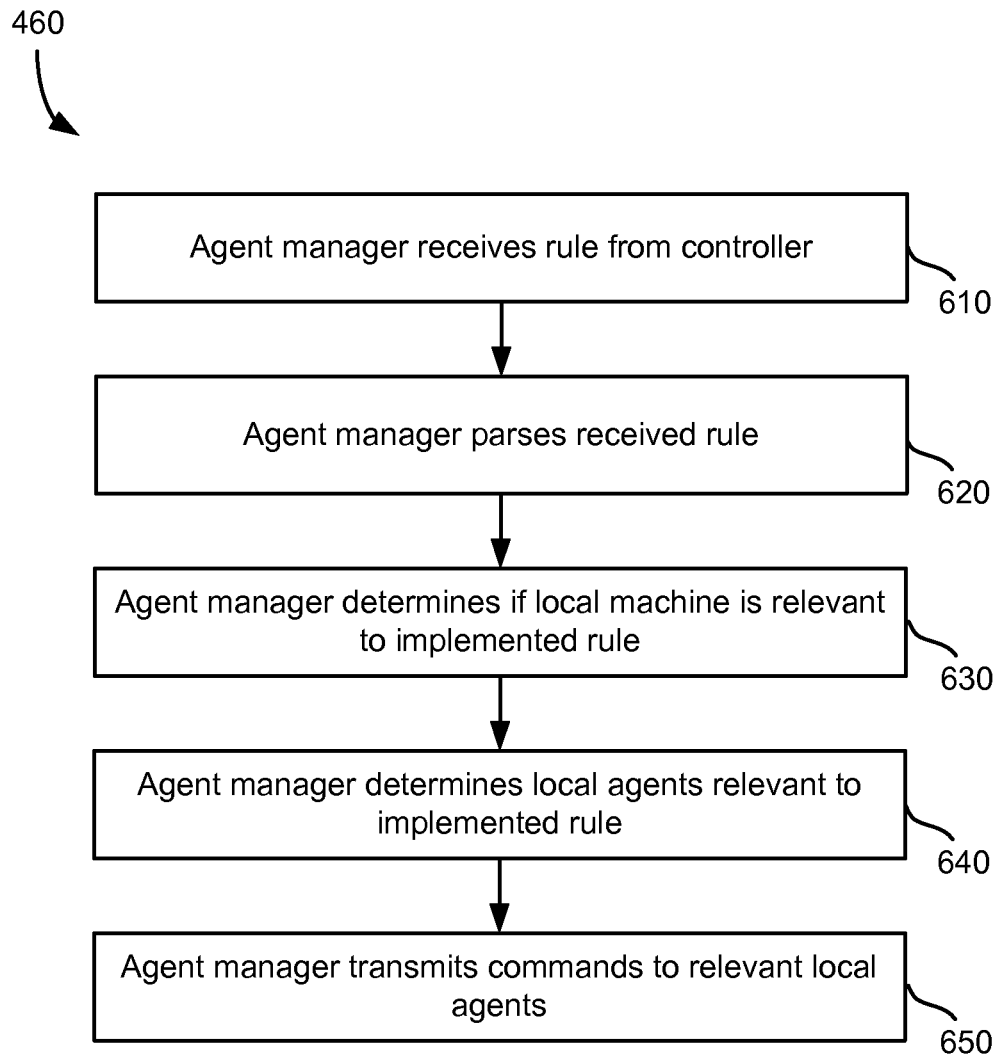
FIG. 6 is a method for applying rules by an agent manager.

FIG. 6 is a method for applying a set of rules. The method of FIG. 6 provides more detail for step 460 the method of FIG. 4. First, the agent manager receives rules, for example from the controller, at step 610. The agent manager may then parse the received rules at step 620. The parsing may be performed by logic contained in the core of the agent manager. The parsing may identify the particular action, agent type to apply the action, machine at which the rules should be implemented, and other implementation rules (such as when to apply the rule).

An agent manager determines whether the local machine is relevant to the implemented rule at step 630. If the rule specifies that action should be taken to one or more machines that includes the local machine, then the local machine is relevant to the rule. If the agent determines that no action is to be taken on the local machine because the local rules to not apply to the local machine, the local machine is not relevant to the rule and no further action is taken.

If the local machine is specified in a rule, the agent manager determines whether any agents exist locally that are relevant to the implemented rule at step 640. Agents are relevant to the implemented rule if the agent type installed on the local server matches one or more of the agents mentioned in the rules for which an agent action is to be performed or if an agent is to be installed. Downloading an agent may be performed by a state module within the agent manager. If action is to be taken with respect to one or more agents on the local machine, the agent manager may then perform tasks or transmit commands to the relevant local agents at step 650. The commands and tasks may include installing or uninstalling an agent, starting, stopping or restarting an agent, installing or uninstalling a plugin, enabling or disabling a feature, or otherwise configuring an agent.

Figure 7:
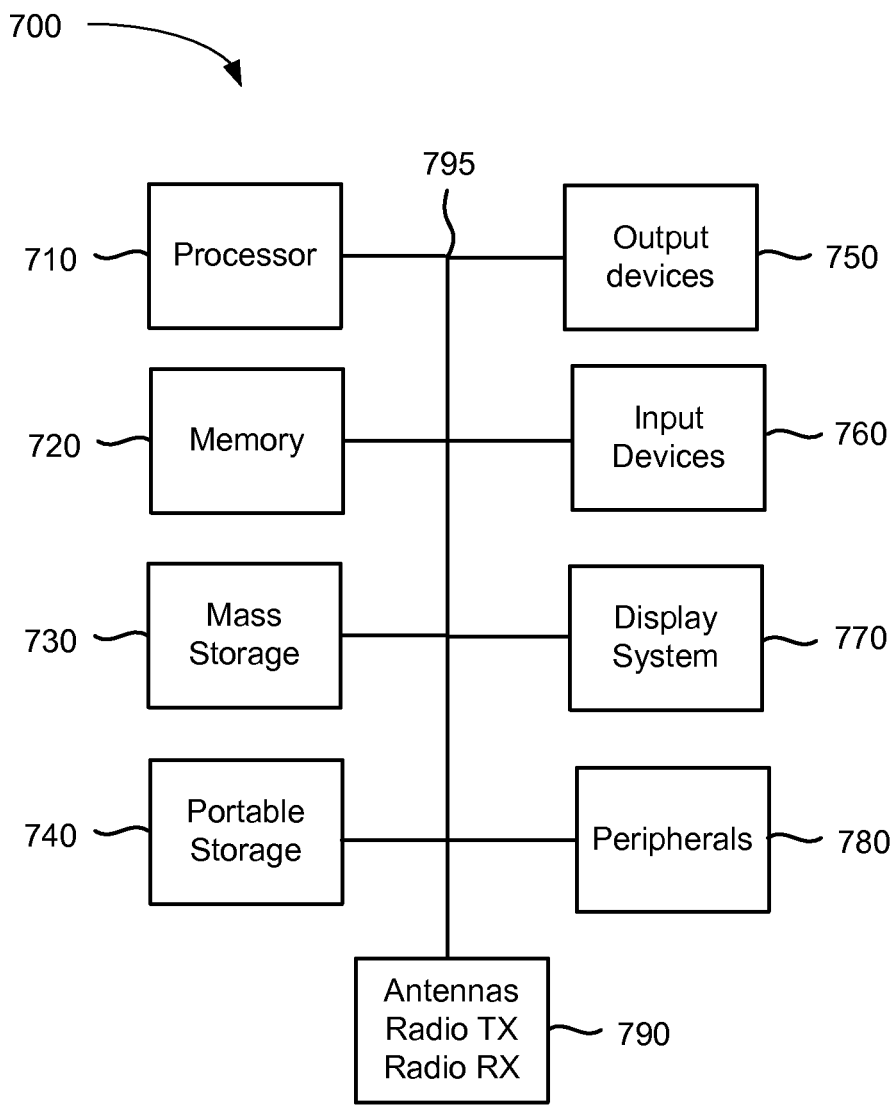
FIG. 7 is a block diagram of computer for implementing the present technology.

FIG. 7 is a block diagram of a system for implementing the present technology. System 700 of FIG. 7 may be implemented in the contexts of the likes of client computer 105 and 192, servers 125, 130, 140, 150, and 160, machine 170, data stores 180 and 190, and controller 190. The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive, an optical disk drive, a flash drive, or other device, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a floppy disk, compact disk or Digital video disc, USB drive, memory card or stick, or other portable or removable memory, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device. Display system 770 may also receive input as a touch-screen.

Peripherals 780 may include any type of computer support device to add additional functionality to the computer system. For example, peripheral device(s) 780 may include a modem or a router, printer, and other device.

The system of 700 may also include, in some implementations, antennas, radio transmitters and radio receivers 790. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, C, C++, Node.JS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for managing agents that monitor a distributed transaction, comprising:
providing an agent manager on a server in a computer network that hosts a plurality of applications, wherein the agent manager manages a plurality of agents executing on the server;
receiving, by the agent manager from a remote server, a set of rules to be applied by the agent manager to one or more agents of the plurality of agents, wherein the rules specify an agent type, an action to take with respect to the agent type, and a machine characteristic;
parsing, by the agent manager, the set of rules to determine one or more agents of the plurality of agents to apply the set of rules, wherein the parsing is based on the agent type, the action to take with respect to the agent type, and the machine characteristic specified in the set of rules;
determining, by the agent manager, which of the plurality of agents to apply the set of rules based on the how the set of rules are parsed; and
applying, by the agent manager, the set of rules by the agent manager to the determined agents to configure the agents.

2. The method of claim 1, further comprising scanning a server that includes the agent manager, the agent and the application, the scanning performed by the agent manager to determine server information and the agents installed on the server.

3. The method of claim 1, wherein configuring an agent includes starting or stopping an agent.

4. The method of claim 1, wherein the rules are created by a user through a user interface.

5. The method of claim 1, wherein the set of rules is applied to a plurality of agent monitors, the plurality of agent monitors including the agent monitor on the server, each agent monitor installed on a different server, the same set of rules applied to each agent monitor on each server.

6. A non-transitory computer readable storage medium having embodied thereon a program, the program being executable by a processor to perform a method for managing agents that monitor a distributed transaction, the method comprising:
providing an agent manager on a server in a computer network that hosts a plurality of applications, wherein the agent manager manages a plurality of agents executing on the server;
receiving, by the agent manager from a remote server, a set of rules to be applied by the agent manager to the agent, wherein the rules specify an agent type, an action to take with respect to the agent type, and a machine characteristic;
parsing the set of rules to determine one or more agents of the plurality of agents to apply the set of rules, wherein the parsing is based on the agent type, the action to take with respect to the agent type, and the machine characteristic specified in the set of rules;
determine which of the plurality of agents to apply the set of rules based on the how the set of rules are parsed; and
applying the set of rules by the agent manager to the determined agents to configure the agents.

7. The non-transitory computer readable storage medium of claim 6, the method further comprising scanning a server that includes the agent manager, the agent and the application, the scanning performed by the agent manager to determine server information and the agents installed on the server.

8. The non-transitory computer readable storage medium of claim 6, wherein configuring an agent includes starting or stopping an agent.

9. The non-transitory computer readable storage medium of claim 6, wherein the rules are created by a user through a user interface.

10. The non-transitory computer readable storage medium of claim 6, wherein the set of rules is applied to a plurality of agent monitors, the plurality of agent monitors including the agent monitor on the server, each agent monitor installed on a different server, the same set of rules applied to each agent monitor on each server.

11. A system for monitoring a garbage collection process, comprising:
a server including a memory and a processor; and
one or more modules stored in the memory and executed by the processor to provide an agent manager, wherein the agent manager manages a plurality of agents executing on the server, receive, by the agent manager from a remote server, a set of rules to be applied by the agent manager to one or more agents of the plurality of agents, wherein the rules specify an agent type, an action to take with respect to the agent type, and a machine characteristic, parse the set of rules to determine one or more agents of the plurality of agents to apply the set of rules, wherein the parsing is based on the agent type, the action to take with respect to the agent type, and the machine characteristic specified in the set of rules; determine which of the plurality of agents to apply the set of rules based on the how the set of rules are parsed, and apply the set of rules by the agent manager to the determined agents to configure the agents.

12. The system of claim 11, the one or more modules further executable to scan a server that includes the agent manager, the agent and the application, the scanning performed by the agent manager to determine server information and the agents installed on the server.

13. The system of claim 11, wherein configuring an agent includes starting or stopping an agent.

14. The system of claim 11, wherein the rules are created by a user through a user interface.

15. The system of claim 11, wherein the set of rules is applied to a plurality of agent monitors, the plurality of agent monitors including the agent monitor on the server, each agent monitor installed on a different server, the same set of rules applied to each agent monitor on each server.

* * * * *